United States Patent
Abdullah et al.

(10) Patent No.: US 11,950,032 B2
(45) Date of Patent: Apr. 2, 2024

(54) G.8032 WITH OPTICAL BYPASS

(71) Applicant: Ciena Corporation, Hanover, MD (US)

(72) Inventors: Bashar Abdullah, Kanata (CA); Marc Holness, Nepean (CA); Priyanshu Lnu, Meerut (IN); Ritesh Ralhan, New Delhi (IN); Rajneesh Mishra, Gurugram (IN)

(73) Assignee: Ciena Corporation, Hanover, MD (US)

( * ) Notice: Subject to any disclaimer, the term of this patent is extended or adjusted under 35 U.S.C. 154(b) by 131 days.

(21) Appl. No.: 17/723,893

(22) Filed: Apr. 19, 2022

(65) Prior Publication Data
US 2023/0283934 A1  Sep. 7, 2023

(30) Foreign Application Priority Data
Mar. 7, 2022 (IN) .............................. 202211012246

(51) Int. Cl.
*H04Q 11/00* (2006.01)
(52) U.S. Cl.
CPC ..... *H04Q 11/0067* (2013.01); *H04Q 11/0003* (2013.01); *H04Q 2011/0064* (2013.01); *H04Q 2011/0073* (2013.01); *H04Q 2011/0079* (2013.01); *H04Q 2011/0092* (2013.01)
(58) Field of Classification Search
CPC .................... H04Q 11/0062; H04Q 2011/0092
See application file for complete search history.

(56) References Cited

U.S. PATENT DOCUMENTS

| | | |
|---|---|---|
| 7,590,054 B1 | 9/2009 | Holness et al. |
| 7,792,044 B2 | 9/2010 | Holness et al. |
| 8,295,175 B2 | 10/2012 | Ellis et al. |
| 8,509,061 B2 | 8/2013 | Holness et al. |
| 8,553,697 B2 | 10/2013 | Allan et al. |
| 8,588,060 B2 | 11/2013 | Holness |
| 8,687,633 B2 | 4/2014 | Rabie et al. |

(Continued)

FOREIGN PATENT DOCUMENTS

| | | |
|---|---|---|
| CA | 2748703 C | 7/2010 |
| EP | 2 417 735 B1 | 6/2017 |

(Continued)

OTHER PUBLICATIONS

Ryoo et al., "Ethernet Ring Protection for Carrier Ethernet Networks", IEEE Communications Magazine, Sep. 2008 (Year: 2008).*

(Continued)

*Primary Examiner* — Shi K Li
(74) *Attorney, Agent, or Firm* — Baratta Law PLLC; Lawrence A. Baratta, Jr.

(57) ABSTRACT

Systems and methods implemented by a network element in a G.8032 ring include steps of operating an Operations, Administration, and Maintenance (OAM) session with an adjacent network element; and detecting an optical bypass in the G.8032 ring based on the OAM session. The steps can include flushing a forwarding database of the network element based on the optical bypass. The steps can include detecting prior to the optical bypass, that a neighboring node includes a ring block; and subsequent to the optical bypass, installing a new channel block. The optical bypass enables faster protection switching and the present disclosure incorporates an optical bypass in G.8032.

17 Claims, 22 Drawing Sheets

(56) References Cited

U.S. PATENT DOCUMENTS

| | | |
|---|---|---|
| 8,737,198 B1 | 5/2014 | Holness et al. |
| 8,855,122 B2 | 10/2014 | Bottorff et al. |
| 8,953,456 B2 | 2/2015 | Mohan et al. |
| 9,025,435 B2 | 5/2015 | Holness et al. |
| 9,075,717 B2 | 7/2015 | Mohan, Jr. et al. |
| 9,106,573 B2 | 8/2015 | Martin et al. |
| 9,160,563 B2 | 10/2015 | Ryoo et al. |
| 9,203,549 B2 | 12/2015 | Holness et al. |
| 9,319,268 B2 | 4/2016 | Allan et al. |
| 9,401,817 B2 | 7/2016 | Holness et al. |
| 9,781,048 B2 | 10/2017 | Holness et al. |
| 9,843,439 B2 | 12/2017 | Rivaud et al. |
| 9,893,937 B2 | 2/2018 | Holness et al. |
| 10,015,066 B2 | 7/2018 | Mishra et al. |
| 10,122,619 B2 | 11/2018 | Holness et al. |
| 10,425,153 B2 | 9/2019 | Holness et al. |
| 10,623,293 B2 | 4/2020 | Hu et al. |
| 10,721,139 B2 | 7/2020 | Holness et al. |
| 10,785,100 B2 | 9/2020 | Holness |
| 11,171,853 B2 | 11/2021 | Holness et al. |
| 11,206,197 B2 | 12/2021 | Holness |
| 2005/0099949 A1 | 5/2005 | Mohan et al. |
| 2005/0099951 A1 | 5/2005 | Mohan et al. |
| 2005/0099954 A1 | 5/2005 | Mohan et al. |
| 2005/0099955 A1 | 5/2005 | Mohan et al. |
| 2007/0268817 A1 | 11/2007 | Smallegange et al. |
| 2010/0135291 A1 | 6/2010 | Martin et al. |
| 2016/0352624 A1 | 12/2016 | Mishra et al. |
| 2018/0102944 A1 | 4/2018 | Mishra et al. |
| 2019/0260671 A1* | 8/2019 | Caird .............. H04L 45/66 |

FOREIGN PATENT DOCUMENTS

| | | |
|---|---|---|
| EP | 2 430 798 B1 | 8/2018 |
| EP | 3 097 659 B1 | 3/2021 |
| WO | 2005069540 A1 | 7/2005 |
| WO | 2010130027 A1 | 11/2010 |
| WO | 2021025826 A1 | 11/2021 |

OTHER PUBLICATIONS

NTT-AT, Intelligent Optical switch Applications, 2000 (Year: 2000).*

* cited by examiner

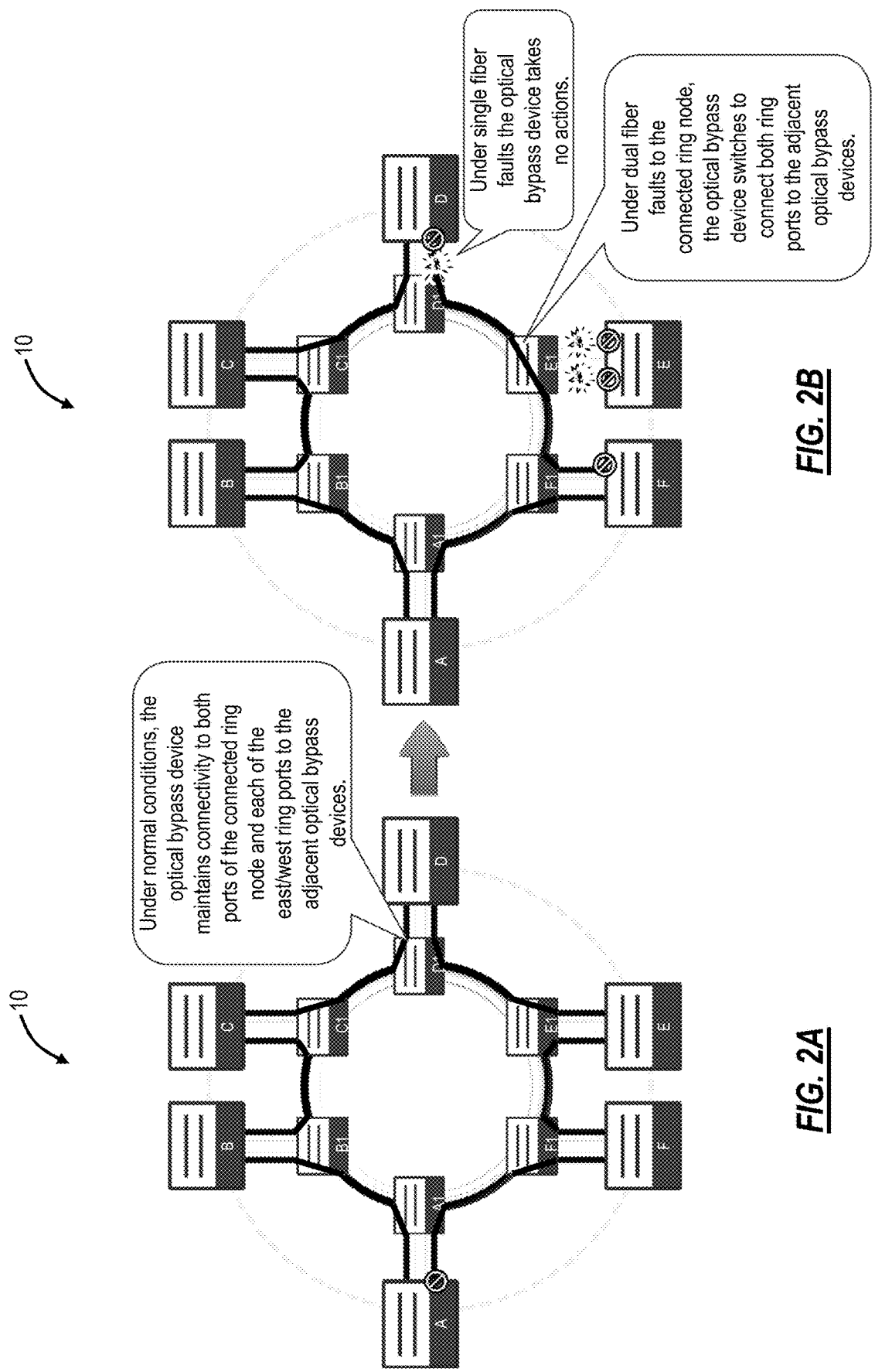

G.8032 Request/State Priority

| Request/state and status | Type | Priority |
|---|---|---|
| Clear | local | highest |
| FS | local | |
| AdjacentNodeChange | local | |
| R-APS (FS) | remote | |
| local SF | local | |
| local clear SF | local | |
| R-APS (SF) | remote | |
| R-APS (MS) | remote | |
| MS | local | |
| WTR Expires | local | |
| WTR Running | local | |
| WTB Expires | local | |
| WTB Running | local | |
| R-APS (NR,RB) | remote | |
| R-APS (NR) | remote | lowest |

FIG. 4

G.8032 State Machine

| Node State | Inputs | | Outputs | |
|---|---|---|---|---|
| | Top priority request | Row | Actions | Next Node State |
| — | State machine initialization | 1 | Stop guard timer<br>Stop WTR timer<br>Stop WTB timer<br>If RPL owner node<br>  Block RPL port<br>  Unblock non-RPL port<br>  Tx R-APS (NR)<br>  If revertive<br>    Start WTR timer<br>  Else<br>If RPL neighbour node<br>  Block RPL port<br>  Unblock non-RPL port<br>  Tx R-APS (NR)<br>Else<br>  Block one ring port<br>  Unblock other ring port<br>  Tx R-APS (NR) | E<br>(Pending) |

*FIG. 5*

G.8032 State Machine

| Node State | Inputs | | Outputs | |
|---|---|---|---|---|
| | Top priority request | Row | Actions | Next Node State |
| A (Idle) | Clear | 1 | No action | A (Idle) |
| | FS | 2 | If requested ring port is already blocked<br>Tx R-APS(FS, DNF)<br>Unblock non-requested ring port<br>Else<br>Block requested ring port<br>Tx R-APS(FS)<br>Unblock non-requested ring port<br>Flush FDB | D (Force Switch) |
| | AdjacentNodeChange | 3 | If PreviousPeerChannelBlock<br>Block ring port<br>Tx R-APS(Flush)<br>Tx R-APS(NR)<br>If NOT PreviousPeerChannelBlock<br>Tx R-APS(Flush) | E (Pending) |
| | R-APS(FS) | | Unblock ring ports<br>Stop Tx R-APS | A (Idle) |
| | local SF | | If failed ring port is already blocked<br>Tx R-APS(SF, DNF)<br>unblock non-failed ring port<br>Else<br>Block failed ring port<br>Tx R-APS(SF)<br>Unblock non-failed ring port<br>Flush FDB | D (Force Switch) |
| | local clear SF | | No action | B (Protection) |
| | R-APS (SF) | | Unblock non-failed ring port<br>Stop Tx R-APS | A (Idle) |
| | : | | | B (Protection) |

*FIG. 6*

G.8032 State Machine

| Node State | Inputs | | Outputs | | Next Node State |
|---|---|---|---|---|---|
| | Top priority request | Row | Actions | | |
| B (Protection) | Clear | | No action | | B |
| | FS | | If requested ring port is already blocked<br>Tx R-APS(FS, DNF)<br>Unblock non-requested ring port<br>Else<br>Block requested ring port<br>Tx R-APS(FS)<br>Unblock non-requested ring port<br>Flush FDB | | D (Force Switch) |
| | AdjacentNodeChange | | If PreviousPeerChannelBlock<br>Block ring port<br>Tx R-APS(Flush)<br>Tx R-APS(NR)<br>If NOT PreviousPeerChannelBlock<br>Tx R-APS(Flush) | | E (Pending)<br><br>B (Protection) |
| | R-APS(FS) | | Unblock ring ports<br>Stop Tx R-APS | | D (Force Switch) |
| | local SF | | If failed ring port is already blocked<br>Tx R-APS(SF, DNF)<br>unblock non-failed ring port<br>Else<br>Block failed ring port<br>Tx R-APS(SF)<br>Unblock non-failed ring port<br>Flush FDB | | B (Protection) |
| | local clear SF | | Start guard timer<br>Tx R-APS(NR)<br>If RPL owner node and revertive mode<br>Start WTR | | E (Pending) |
| | R-APS(SF) | | No action | | B (Protection) |

*FIG. 7*

G.8032 State Machine

| Node State | Inputs: Top priority request | Row | Actions | Next Node State |
|---|---|---|---|---|
| C (Manual Switch) | Clear | | If any ring port blocked Start guard timer Tx R-APS(NR) If RPL owner node and revertive mode Start WTB | E (Pending) |
| | FS | | If requested ring port is already blocked Tx R-APS(FS,DNF) Unblock non-requested ring port Else Block requested ring port Tx R-APS(FS) Unblock non-requested ring port Flush FDB | D (Force Switch) |
| | AdjacentNodeChange | | If PreviousPeerChannelBlock Block ring port Tx R-APS(Flush) Tx R-APS(NR) If NOT PreviousPeerChannelBlock Tx R-APS(Flush) | E (Pending) C (Manual Switch) |
| | R-APS(FS) | | Unblock ring ports Stop Tx R-APS | D (Force Switch) |
| | local SF | | If failed ring port is already blocked Tx R-APS(SF,DNF) unblock non-failed ring port Else Block failed ring port Tx R-APS(SF) Unblock non-failed ring port Flush FDB | B (Protection) |
| | local clear SF | | No action | C (Manual Switch) |
| | : | | | |

*FIG. 8*

G.8032 State Machine

| Node State | Inputs | | Outputs | Next Node State |
|---|---|---|---|---|
| | Top priority request | Row | Actions | |
| D (Force Switch) | Clear | | If any ring port blocked Start guard timer Tx R-APS(NR) If RPL owner node and revertive mode Start WTB | E (Pending) |
| | FS | | Block requested ring port Tx R-APS(FS) Flush FDB | D (Force Switch) |
| | AdjacentNodeChange | | If PreviousPeerChannelBlock Block ring port Tx R-APS(Flush) Tx R-APS(NR) If NOT PreviousPeerChannelBlock Tx R-APS(Flush) | E (Pending) |
| | | | | D (Force Switch) |
| | R-APS(FS) | | No Action | D (Force Switch) |
| | local SF | | If failed ring port is already blocked: Tx R-APS (SF,DNF) Unblock non-failed ring port Else Block failed ring port Tx R-APS (SF) Unblock non-failed ring port Flush FDB | D (Force Switch) |
| | local clear SF | | No action | D (Force Switch) |
| | : | | | |

*FIG. 9*

G.8032 State Machine

| Node State | Inputs | | Outputs | | Next Node State |
|---|---|---|---|---|---|
| | Top priority request | Row | Actions | | |
| E (Pending) | Clear | | If RPL owner node<br>　Stop WTR<br>　Stop WTB<br>If RPL port is blocked<br>　Tx R-APS(NR, RB, DNF)<br>　Unblock non-RPL port<br>Else<br>　Block RPL port<br>　Tx R-APS(NR, RB)<br>　Unblock non-RPL port<br>　Flush FDB | | A (Idle) |
| | FS | | If requested ring or is already blocked:<br>　Tx-R-APS(FS,DNF)<br>　Unblock non-requested ring port<br>Else<br>　Block requested ring port<br>　Tx R-APS(FS)<br>　Unblock non-requested ring port<br>　Flush FDB<br>If RPL owner node<br>　Stop WTR<br>　Stop WTB | | D (Force Switch) |
| | AdjacentNodeChange | | If PreviousPeerChannelBlock<br>　Block ring port<br>　Tx R-APS(Flush)<br>　Tx R-APS(NR) | | E (Pending) |
| | | | If NOT PreviousPeerChannelBlock<br>　Tx R-APS(Flush) | | E (Pending) |
| | R-APS(FS) | | Unblock ring ports<br>Stop Tx R-APS<br>If RPL owner node<br>　Stop WTR<br>　Stop WTB | | D (Force Switch) |

FIG. 10

G.8032 State Machine

| Node State | Inputs | | Outputs | |
|---|---|---|---|---|
| | Top priority request | Row | Actions | Next Node State |
| E (Pending) | local SF | | If failed ring port is already blocked<br>  Tx R-APS(SF, DNF)<br>  unblock non-failed ring port<br>Else<br>  Block failed ring port<br>  Tx R-APS(SF)<br>  Unblock non-failed ring port<br>  Flush FDB<br>If RPL owner node<br>  Stop WTR<br>  Stop WTB | B (Protection) |
| | local clear SF | : | No action | E (Pending) |

FIG. 11

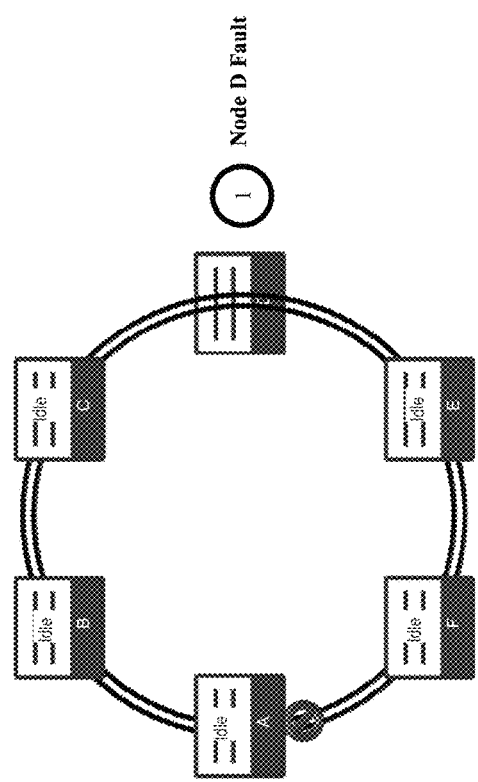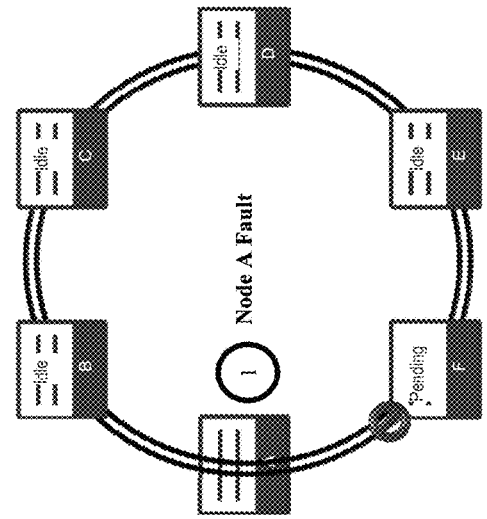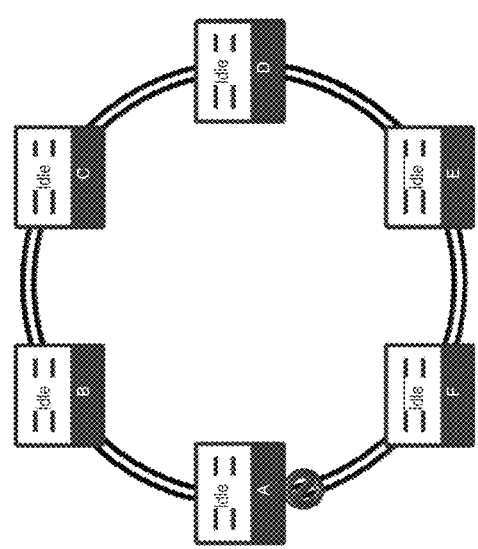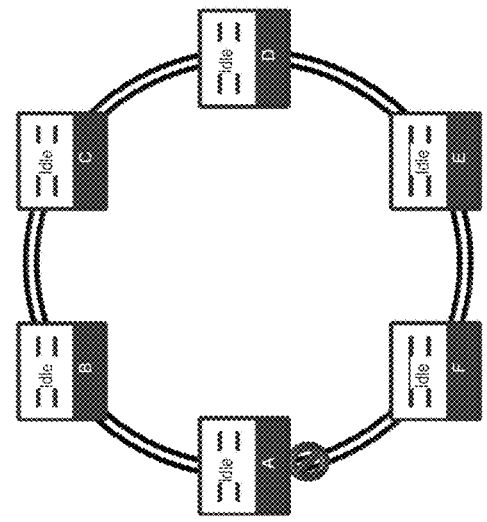
FIG. 12
FIG. 13

G.8032 WITH OPTICAL BYPASS

FIELD OF THE DISCLOSURE

The present disclosure generally relates to networking. More particularly, the present disclosure relates to systems and methods for preserving G.8032 ring redundancy and a loop free topology in the presence of optical bypass relays.

BACKGROUND OF THE DISCLOSURE

The Ethernet Ring Protection Switching (ERPS) protocol is an industry standard and is specified within International Telecommunication Union ITU SG15 Q9, under G.8032 "Ethernet ring protection switching" (G.8032v1-2008, G.8032v2-2010, G.8032v3-2012, and G.8032v4-2015), the contents of which are incorporated by reference. ERPS specifies protection switching mechanisms and a protocol for Ethernet layer network (ETH) rings. Each Ethernet Ring Node is connected to adjacent Ethernet Ring Nodes participating in the same Ethernet Ring, using two independent links. A ring link is bounded by two adjacent Ethernet Ring Nodes, and a port for a ring link is called a ring port. The minimum number of Ethernet Ring Nodes in an Ethernet Ring is two. Two fundamental principles of G.8032 include a) loop avoidance and b) utilization of learning and a forwarding Database (FDB) mechanism defined in the Ethernet flow forwarding function (ETH_FF). Loop avoidance in an Ethernet Ring is achieved by guaranteeing that, at any time, traffic may flow on all but one of the ring links. This particular link is called the Ring Protection Link (RPL), and under normal conditions, this ring link is blocked, i.e., not used for service traffic. One designated Ethernet Ring Node, the RPL Owner Node, is responsible for blocking traffic at one end of the RPL. Under an Ethernet ring failure condition, the RPL Owner Node is responsible for unblocking its end of the RPL (unless the RPL has failed) allowing the RPL to be used for traffic. The other Ethernet Ring Node adjacent to the RPL, the RPL Neighbor Node, may also participate in blocking or unblocking its end of the RPL. The event of an Ethernet Ring failure results in protection switching of the traffic. This is achieved under the control of the ETH_FF functions on all Ethernet Ring Nodes. An Automatic Protection Switching (APS) protocol is used to coordinate the protection actions over the ring.

G.8032v2 introduced additional features, such as: multi-ring/ladder network support; revertive/non-revertive mode after condition, that is causing the switch, is cleared; administrative commands: Forced Switch (FS), Manual Switch (MS) for blocking a particular ring port; flush FDB (Filtering database) logic, which significantly reduces amount of flush FDB operations in the ring; and support of multiple ERP instances on a single ring.

G.8032 deployments have proliferated as it supports a simplified network architecture and enables fast protection switching at the Ethernet layer. It is also possible to use optical bypass devices in an optical layer, where G.8032 ring spans are formed therewith. The optical bypass devices are configured to connect the two ring ports (East and West) when there is a failure at a G.8032 node, providing even faster protection switching at the optical layer. There is a need to incorporate the functionality of the optical bypass devices with G.8032.

BRIEF SUMMARY OF THE DISCLOSURE

The present disclosure relates to systems and methods for preserving G.8032 ring redundancy and a loop free topology in the presence of optical bypass relays. The present disclosure includes an extension to the ring protocol (G.8032) to support even faster (e.g., nanoseconds to a few milliseconds) service restoration by coupling optical nodal bypass under-lay (as a result of a fault) with G.8302 protocol resiliency, while mitigating looping and retaining loop-free connectivity. Also, while the ring nodes are in a Force Switch state, nodes local to a fault can signal this (fault) condition around the ring (to downstream nodes). This is a generic enhancement to the G.8032 state machine which makes the ring behavior more robust during fault conditions. Also, in the event of a nodal bypass (due to an optical level bypass), the loop-free behavior of the ring can be preserved. The present disclosure includes rapid detection of a G.8032 nodal bypass as a result of an optical bypass affecting the packet layer. This scheme leverages Ethernet layer Operations, Administration, and Maintenance (OAM) protocol sessions (e.g., Continuity Check Messages (CCMs)). The nodal bypass is detected using the Remote Maintenance End Point (MEP) discovery to identify a change in the Remote MEP. The present disclosure also includes rapid detection of a G.8032 channel block that has been bypassed (by the optical level bypass) by leveraging Ethernet OAM protocol sessions (e.g., CCMs), and utilizing the port (block) status information that is conveyed in the CCMs Protocol Data Units (PDUs).

In an embodiment, a network element configured to operate in a G.8032 ring includes a plurality of ports interconnected by circuitry configured to operate an Operations, Administration, and Maintenance (OAM) session with an adjacent network element, and detect an optical bypass in the G.8032 ring based on the OAM session. The circuitry can be further configured to flush a forwarding database of the network element based on the optical bypass. The circuitry can be further configured to detect, prior to the optical bypass, that a neighboring node includes a ring block, and, subsequent to the optical bypass, install a new channel block on the G.8032 ring. The circuitry can be further configured to remove the new channel block if another channel block is detected on the G.8032 ring. The ring block can be detected via a Type-Length-Value (TLV) field in a packet associated with the OAM session. The OAM session can include Continuity Check Messages (CCMs). The optical bypass can be detected based on an auto remote Maintenance End Point (MEP) discovery and a timeout of an old remote MEP. The network element can further include an optical switching device that is configured to connect ring ports of the plurality of ports to the G.8032 ring under normal conditions and to connect the ring ports together responsive to a node fault, thereby providing the optical bypass.

In another embodiment, a non-transitory computer-readable medium includes instructions that, when executed, cause a network element in a G.8032 ring to perform steps of operating an Operations, Administration, and Maintenance (OAM) session with an adjacent network element; and detecting an optical bypass in the G.8032 ring based on the OAM session. The steps can further include flushing a forwarding database of the network element based on the optical bypass. The steps can further include detecting prior to the optical bypass, that a neighboring node includes a ring block; and, subsequent to the optical bypass, installing a new channel block on the G.8032 ring. The steps can further include removing the new channel block if another channel block is detected on the G.8032 ring. The ring block can be detected via a Type-Length-Value (TLV) field in a packet associated with the OAM session. The OAM session can include Continuity Check Messages (CCMs). The optical bypass can be detected based on an auto remote Maintenance End Point (MEP) discovery and a timeout of an old remote MEP. An optical switching device can be configured to connect ring ports of the network element to the G.8032 ring under normal conditions and to connect the ring ports together responsive to a node fault, thereby providing the optical bypass.

In a further embodiment, a method implemented by a network element in a G.8032 ring includes steps of operating an Operations, Administration, and Maintenance (OAM) session with an adjacent network element; and detecting an optical bypass in the G.8032 ring based on the OAM session. The steps can further include flushing a forwarding database of the network element based on the optical bypass. The steps can further include detecting prior to the optical bypass, that a neighboring node includes a ring block; and, subsequent to the optical bypass, installing a new channel block on the G.8032 ring. The optical bypass can be detected based on an auto remote Maintenance End Point (MEP) discovery and a timeout of an old remote MEP.

BRIEF DESCRIPTION OF THE DRAWINGS

The present disclosure is illustrated and described herein with reference to the various drawings, in which like reference numbers are used to denote like system components/method steps, as appropriate, and in which:

FIGS. 2A-2B are network diagrams of the network including optical bypass equipment A1, B1, C1, D1, E1, F1 and network elements, nodes A, B, C, D, E, F, forming a G.8032 ring via the optical bypass equipment, with FIG. 2A illustrating normal conditions (no fault), and FIG. 2B illustrating a single fiber fault at node D and a dual fiber fault or node fault at node E.

FIGS. 4-11 are tables of G.8032 request/state priority and of the G.8032 state machine with the addition of an adjacent node change based on an optical bypass event.

FIGS. 12-22 are network diagrams illustrating example faults and behaviors in the network with optical bypass.

DETAILED DESCRIPTION OF THE DISCLOSURE

The present disclosure relates to systems and methods for preserving G.8032 ring redundancy and a loop free topology in the presence of optical bypass relays.

G.8032 Ring with Optical Bypass

Figures 1A, 1B:
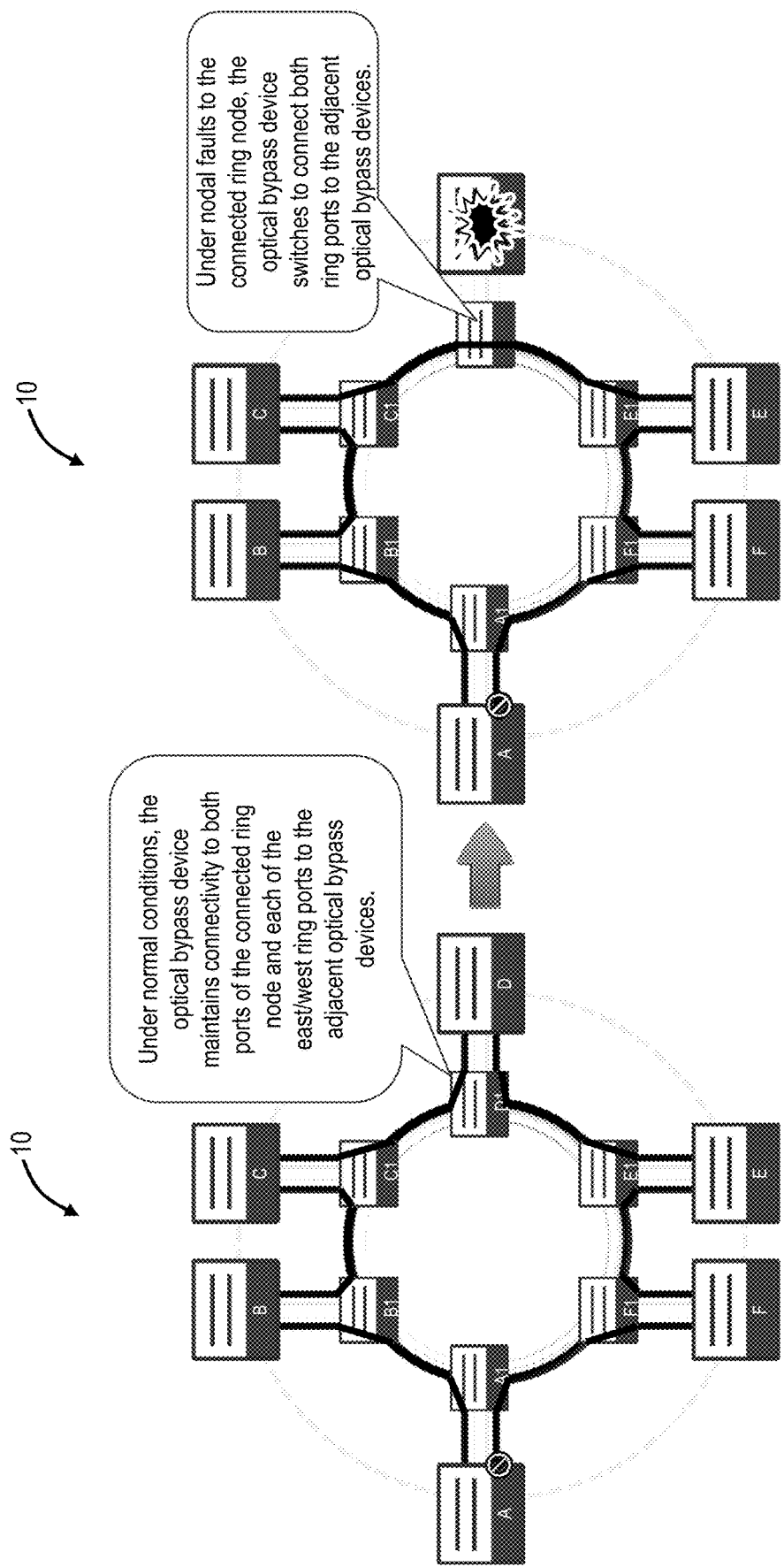
FIGS. 1A-1B are network diagrams of a network including optical bypass equipment A1, B1, C1, D1, E1, F1 and network elements, nodes A, B, C, D, E, F, forming a G.8032 ring via the optical bypass equipment, with FIG. 1A illustrating normal conditions (no fault), and FIG. 1B illustrating a fault at the node E.

FIGS. 1A-1B are network diagrams of a network 10 including optical bypass equipment A1, B1, C1, D1, E1, F1 and network elements, nodes A, B, C, D, E, F, forming a G.8032 ring via the optical bypass equipment, with FIG. 1A illustrating normal conditions (no fault), and FIG. 1B illustrating a fault at the node E. FIGS. 2A-2B are network diagrams of the network 10 including optical bypass equipment A1, B1, C1, D1, E1, F1 and network elements, nodes A, B, C, D, E, F, forming a G.8032 ring via the optical bypass equipment, with FIG. 2A illustrating normal conditions (no fault), and FIG. 2B illustrating a single fiber fault at node D and a dual fiber fault or node fault at node E.

The optical bypass equipment A1, B1, C1, D1, E1, F1, at each node, is configured to connect the nodes A, B, C, D, E, F to the ring under normal conditions (FIG. 1A), and to interconnect the ring for a passthrough when there is a nodal fault (FIG. 1B). The optical bypass equipment A1, B1, C1, D1, E1, F1 can be an optical protection switch, bypass switch, etc. That is, under normal conditions, the optical bypass device maintains connectivity to both ports of the connected ring node and each of the east/west ring ports to the adjacent optical bypass devices. Under nodal faults to the connected ring node, the optical bypass device switches to connect both ring ports to the adjacent optical bypass devices.

The basis of this disclosure is the use of optical bypass equipment (i.e., bypass A1, B1, C1, D1, E1, F1) to constitute a G.8032 ring (i.e., nodes A, B, C, D, E, F). FIGS. 1A-1B depict the inner ring network elements representing the optical bypass devices and the outer ring network elements representing the packet switching devices operating the ITU-T G.8032 Ring Automatic Protection Switching (RAPS) protocol.

An optical bypass event can occur as a result of a nodal outage (e.g., faults, software upgrades, power outage) as depicted in FIG. 1B, or dual fiber faults to the same ring node, as depicted in FIG. 2B.

Under normal conditions, an optical bypass device (e.g., bypass D1) maintains connectivity to both ports of the connected ring node (e.g., node D) and each of the east/west ring ports to the adjacent optical bypass devices (e.g., bypass C1 & E1). In the event of a ring nodal fault (e.g., node D), the optical bypass connected node D to the G.8032 ring initiates a protection switch, whereby it switches connectivity directly between the ring nodes to each of adjacent optical bypass C1 and E1, resulting in a reconstituted ring.

Importantly, this optical bypass protection switch is invisible to the standard G.8032 ring protocol and ring nodes. As such, the optical bypass under these conditions is not detectable by adjacent G.8032 ring nodes (e.g., nodes C & E) and may result in incorrect forwarding information on the G.8032 ring. As such, the G.8032 ring nodes remaining on the ring, must be able to detect this change in the ring topology and take action to refresh its forwarding entries. This can result in prolonged blackholing scenarios. Actual customer reported outage durations is on the order of 2-3 minutes, until the configured Media Access Control (MAC) age out timer expires.

Adjacent Node Change Detection

Figure 3B:
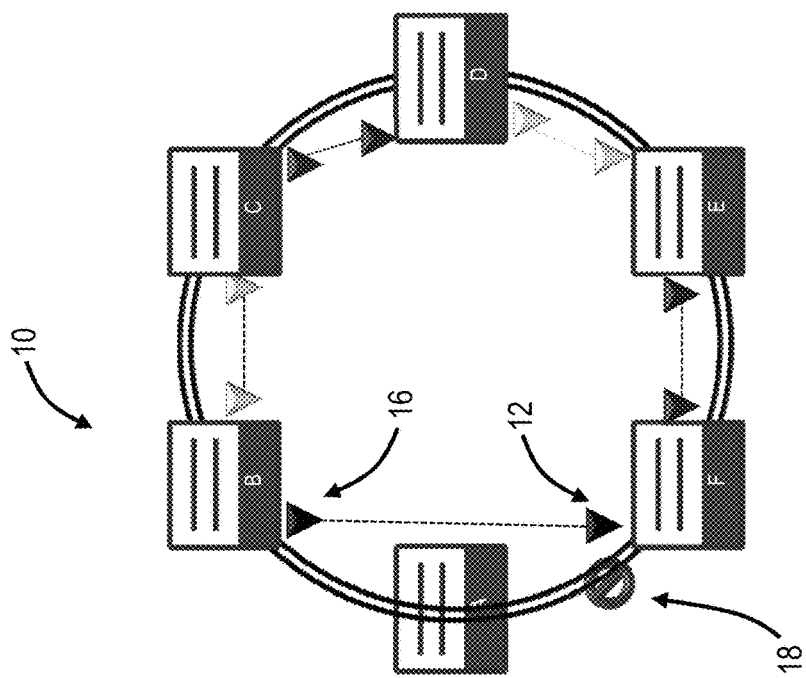
FIGS. 3A-3B are network diagrams of a network including network elements, nodes A, B, C, D, E, F, forming a G.8032 ring via the optical bypass equipment (not shown), with FIG. 3A illustrating normal conditions (no fault), and FIG. 3B illustrating a fault at the node A and a corresponding optical bypass event.
Figure 3A:
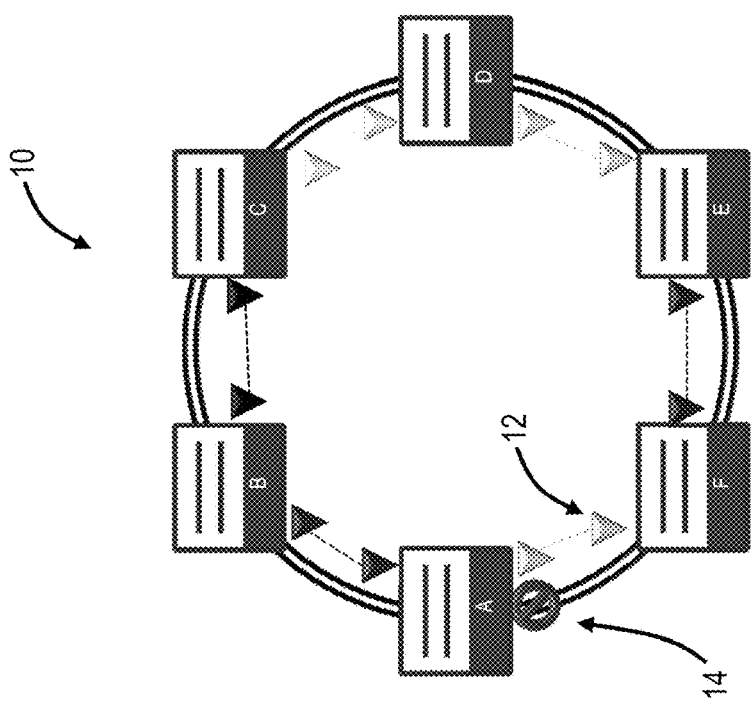

The present disclosure leverages CCMs to monitor the G.8032 ring spans and to detect when an optical bypass event has occurred. FIGS. 3A-3B are network diagrams of a network 10 including network elements, nodes A, B, C, D, E, F, forming a G.8032 ring via the optical bypass equipment (not shown), with FIG. 3A illustrating normal conditions (no fault), and FIG. 3B illustrating a fault at the node A and a corresponding optical bypass event.

In FIG. 3A, CCM sessions via Down MEPs 12 are created as shown. Of note, in this example, a ring block 14 is on a port of the node A facing the node F. The Down MEPs 12 are configured with auto Remote MEP discovery. All sessions created at same Maintenance Entity Group (MEG) Level with same MEG identifier and on the same Virtual Local Area Network (VLAN). In FIG. 3B, there is an optical bypass event at the node A. This is detected, If a new Remote MEP 16 is discovered and an old Remote MEP 16 has detected "CCM timeout", then this is indicative of a change in ring topology (e.g., Optical Node Bypass).

By defining an approach as illustrated in FIGS. 3A-3B to detect that an optical bypass event has occurred, this can enable the G.8032 ring to take action and flush its FDB using an existing RAPS FDB flush propagation event. The approach proposed to monitor and detect an optical bypass, can be simplified to detecting whether a G.8032 ring neighbor node has changed. When a G.8032 ring node comes up, it can monitor the ring spans by operating an IEEE 802.1ag Down MEP using a CCM session, on each RAPS ring port. The CCM interval is inconsequential to the operation of this approach and only serves to establish the detection performance, and for this reason it can be any value. In order to configure a MEP, a remote MEP ID is required.

There can be two approaches to determine the remote MEP ID. The first is to use a static configuration—the typical usage. The second approach which is proposed for this novelty is to use a dynamic discovery of the remote MEP. By using this approach method, a change in the remote MEP discovered can be used to detect if a ring node has changed. The novelty is in using this second approach to not only detect the neighbor change, but to also initiate the RAPS FDB flush propagation to re-establish the forwarding entries.

Previous Peer Channel Block Determination

However, not only is the optical bypass detection required, so is the recreation of any channel blocks 14 on the ring that have been bypassed, to ensure that the G.8032 ring does not form a network loop. This would require detecting if a neighbor node, before an optical bypass, had a channel block, as in the node A in FIG. 3A. The approach to detect this channel block status is to use a CCM port status Type-Length-Value (TLV) to exchange this information with neighbor nodes. Then following a bypass event, to install a channel block 18 to replace the bypassed block 14. This new channel block 18 could be temporary and may be removed if another channel block on the ring is detected via the monitoring of G.8032 RAPS PDU types reflecting that a channel block is installed somewhere else on the ring. If no event on the ring is detected that represents a channel block, the temporary channel block remains in place to guarantee the loop free topology of the ring. CCMs Tx with Port Status TLV—Port Status TLV set to psBlocked if MEP on Channel Block port, and otherwise set to psUp.

FIGS. 4-11 are tables of G.8032 request/state priority and of the G.8032 state machine with the addition of an adjacent node change based on an optical bypass event.

Failure Scenario Examples

The following FIGS. 12-22 all describe example faults and behaviors in the network 10 with optical bypass.

FIG. 12 illustrates the ring block on node A and a node D fault. There is an optical bypass at node D. The adjacent nodes C, E detect the bypass based on CCM timeout and new remote CCM discovered. The nodes C, E perform a Tx R-APS(Flush) and there is no state machine state change.

FIG. 13 illustrates the ring block on node A along with a node A fault. There is an optical bypass at node A. The adjacent nodes B, F detect the bypass based on CCM timeout and new remote CCM discovered. At the node B, there is a Tx R-APS(Flush) and there is no state machine state change. At the node F, the ring block is installed, there are state machine changes—Tx R-APS(Flush), Tx R-APS (NR), Next state→PENDING.

Figure 14:
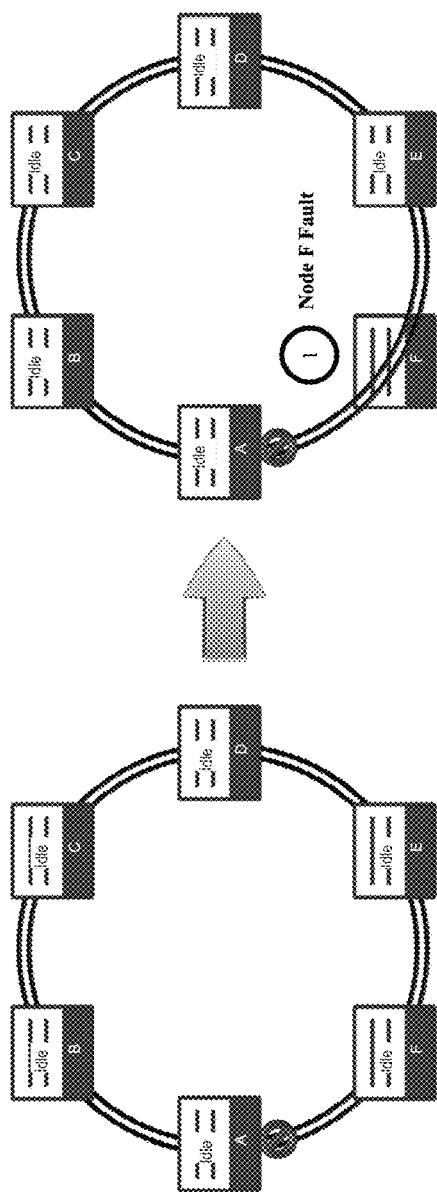

FIG. 14 illustrates the ring block on node A along with a node F fault. There is an optical bypass at node F. The adjacent nodes A, E detect the bypass based on CCM timeout and new remote CCM discovered. The nodes A, E perform a Tx R-APS(Flush) and there is no state machine state change.

Figure 15:
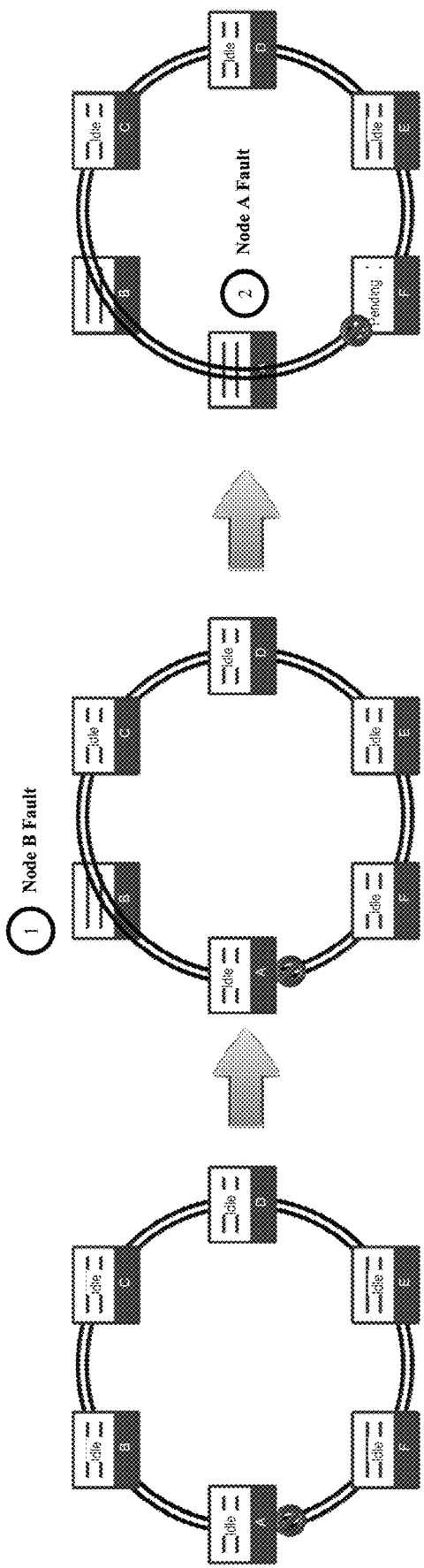

FIG. 15 illustrates a dual fault scenario where the ring block is initially on node A and a first fault on node B followed by a second fault on node A. With the first fault, there is an optical bypass at node B. The adjacent nodes A, C detect the bypass based on CCM timeout and new remote CCM discovered. The nodes A, C perform a Tx R-APS (Flush) and there is no state machine state change. With the second fault, there is an optical bypass at node A. The adjacent nodes F, C detect the bypass based on CCM timeout and new remote CCM discovered. At the node F, the ring block is installed, there are state machine changes—Tx R-APS(Flush), Tx R-APS(NR), Next state 4 PENDING. At the node C, there is a Tx R-APS(Flush) and there is no state machine state change.

Figure 16:
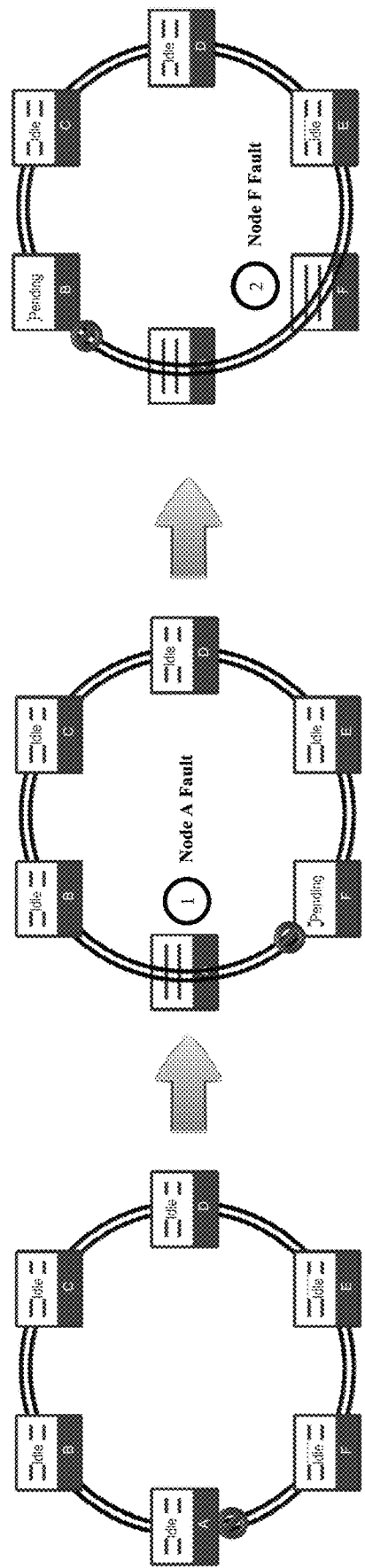
Figure 17:
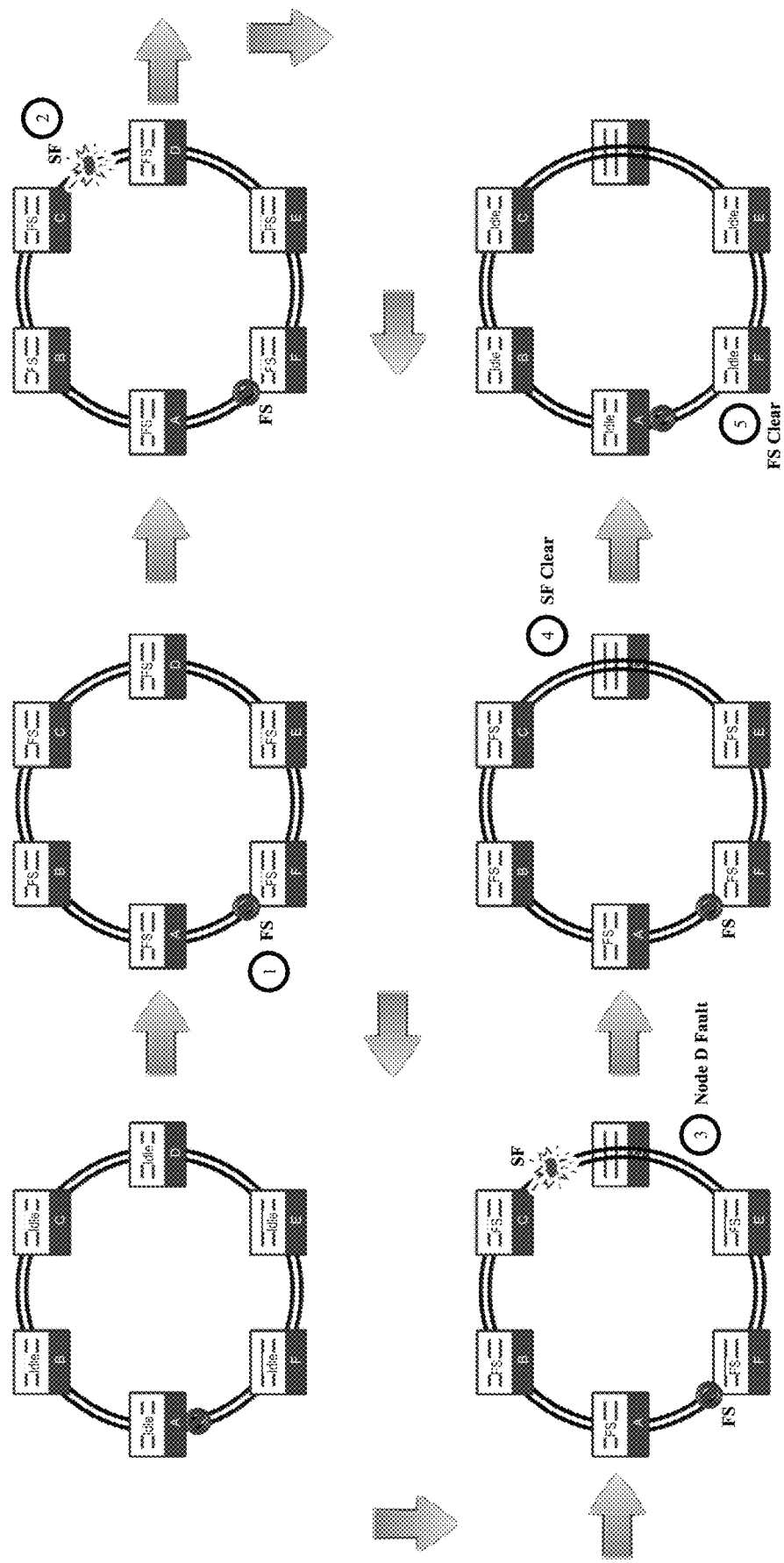
Figure 18:
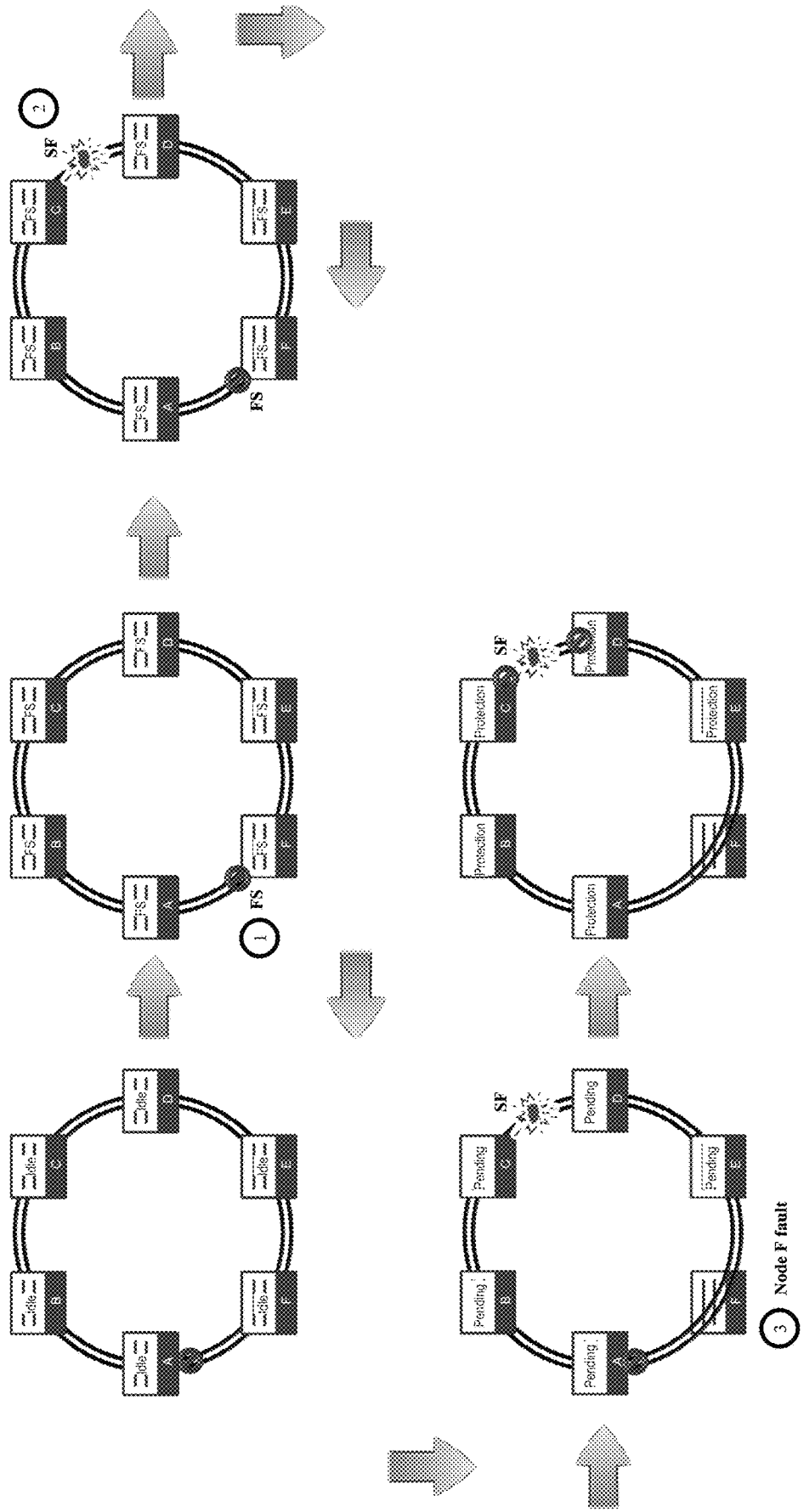
Figure 19:
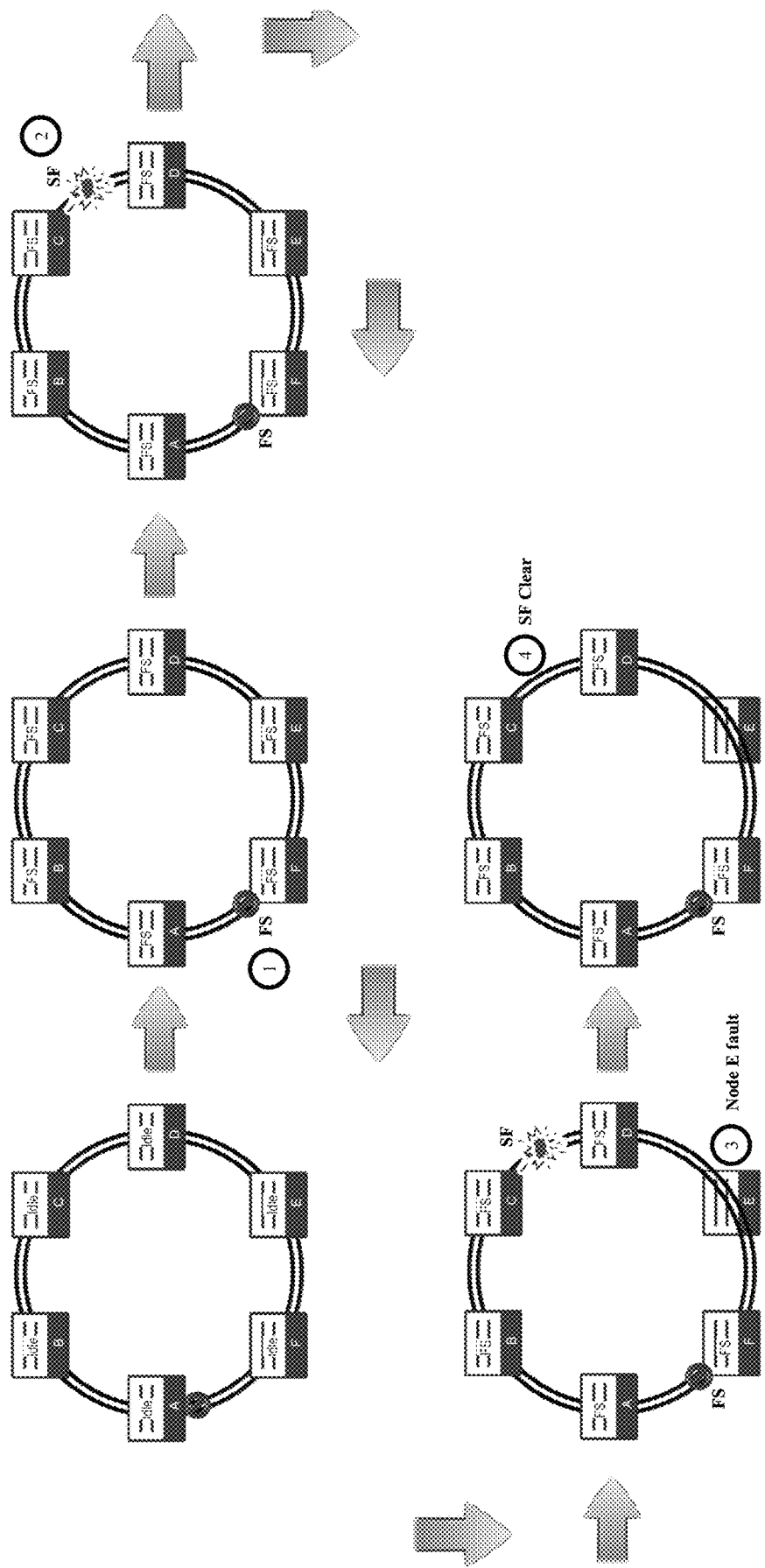
Figure 20:
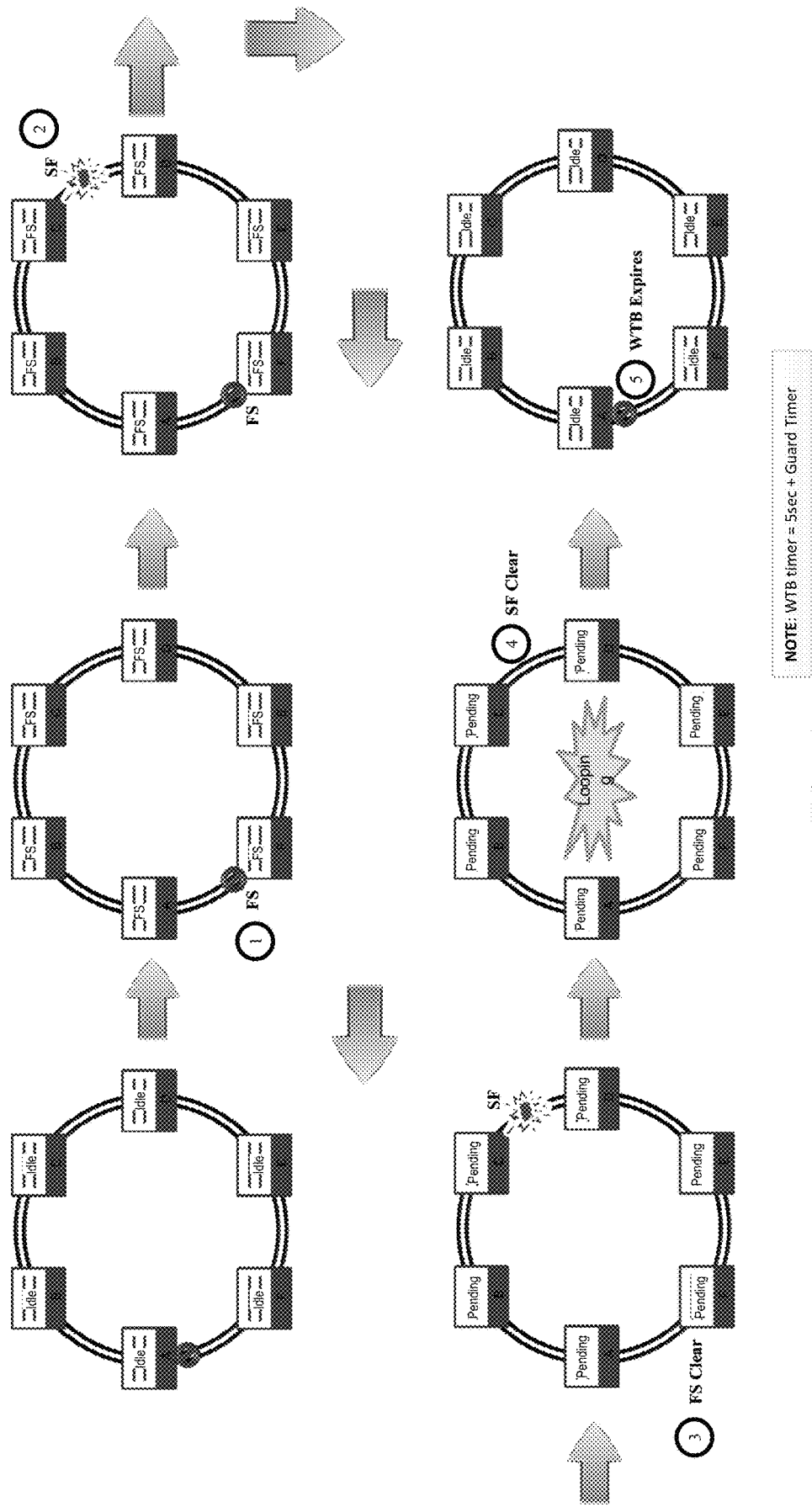
Figure 21:
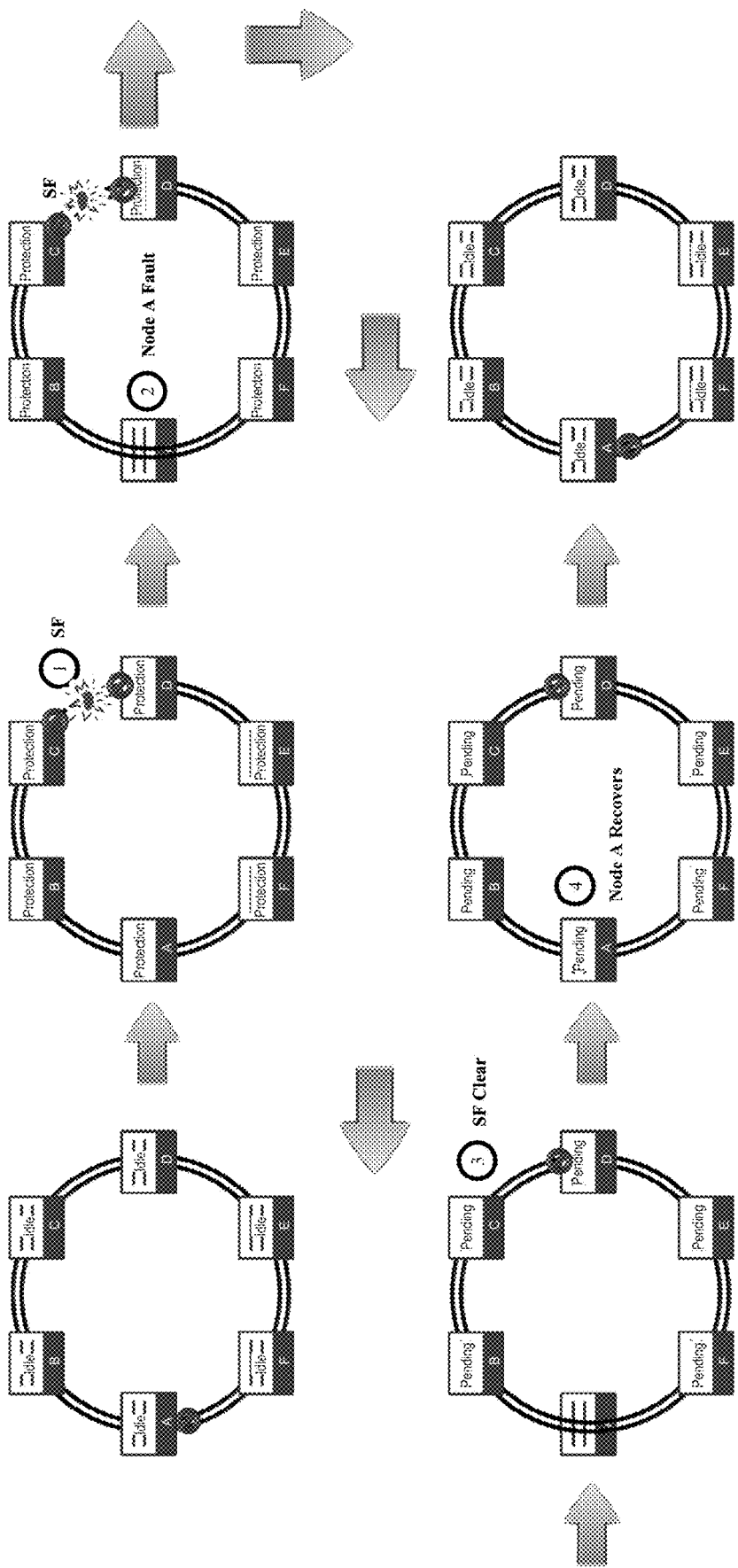
Figure 22:
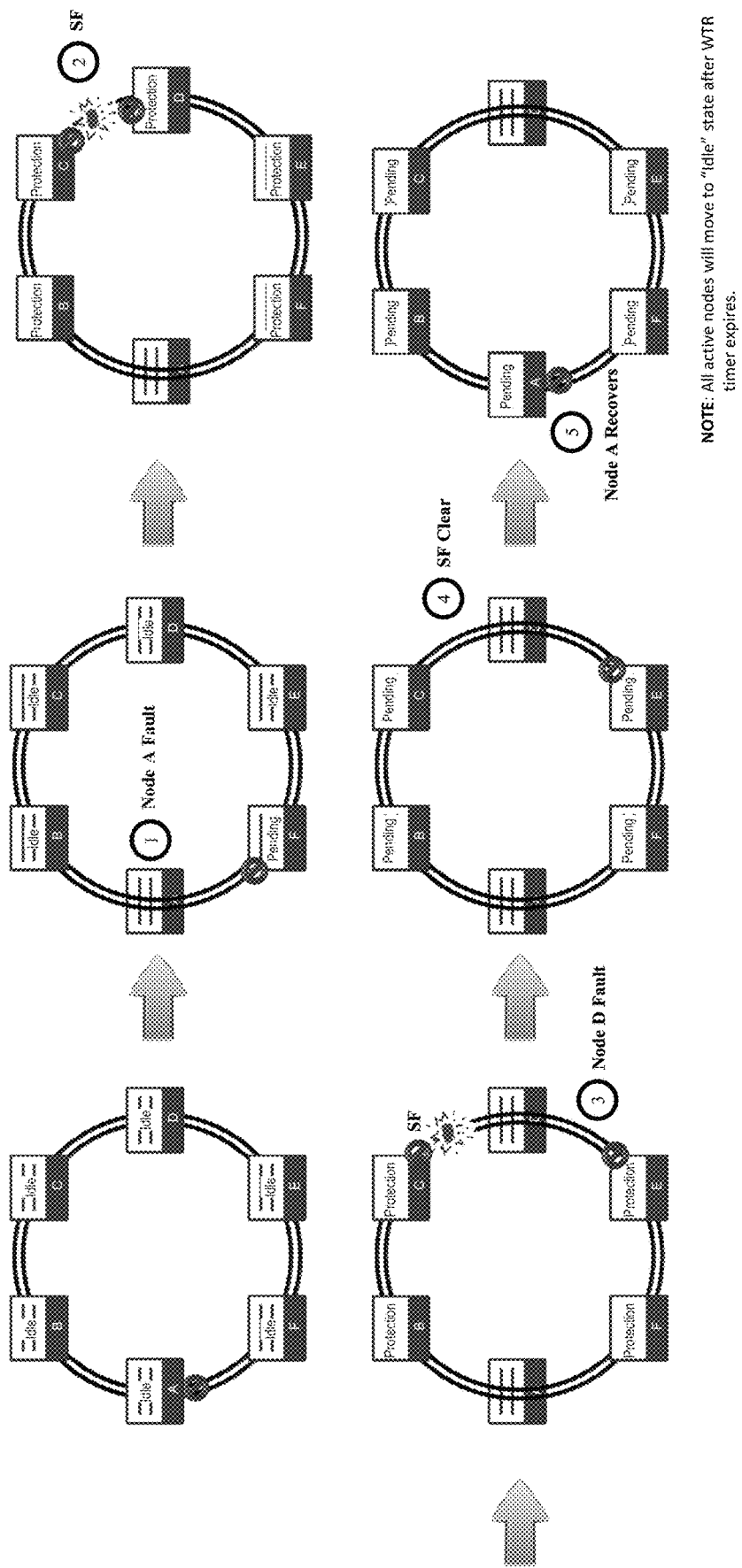

FIG. 16 illustrates a dual fault scenario where the ring block is initially on node A and a first fault on node A followed by a second fault on node F. With the first fault, there is an optical bypass at node A. The adjacent nodes B, F detect the bypass based on CCM timeout and new remote CCM discovered. At the node F, the ring block is installed, there are state machine changes—Tx R-APS(Flush), Tx R-APS(NR), Next state 4 PENDING. At the node B, there is a Tx R-APS(Flush) and there is no state machine state change. With the second fault, there is an optical bypass at node F. The adjacent nodes E, B detect the bypass based on CCM timeout and new remote CCM discovered. At the node B, the ring block is installed, there are state machine changes—Tx R-APS(Flush), Tx R-APS(NR), Next state 4 PENDING. At the node E, there is a Tx R-APS(Flush) and there is no state machine state change.

FIGS. 17-22 are various network diagrams illustrating multiple fault scenarios.

Process

Figure 23:
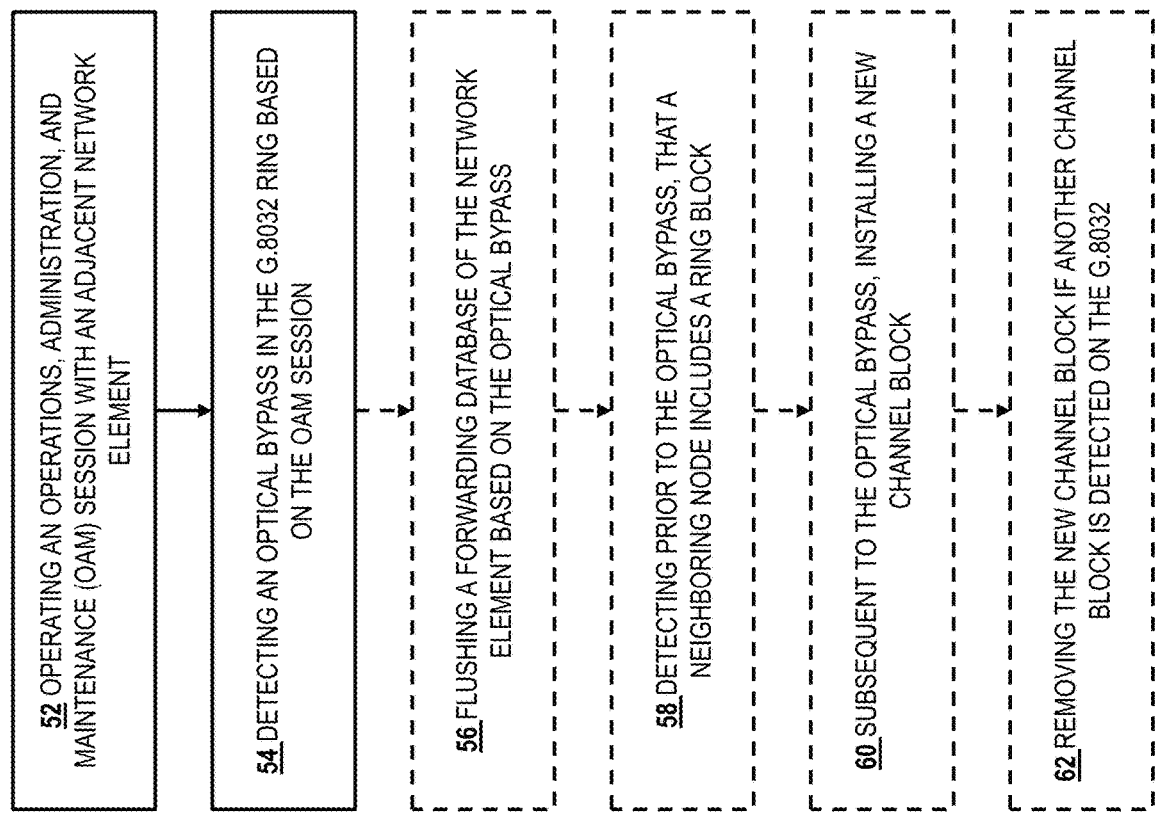
FIG. 23 is a flowchart of a process for optical bypass with G.8032.

FIG. 23 is a flowchart of a process 50 for optical bypass with G.8032. The process 50 can be realized in any of the nodes A, B, C, D, E, F in the network 10. Also, the process 50 can be a method having steps, implemented via an apparatus that is configured to execute the steps, as a non-transitory computer-readable medium having instructions for executing the steps, and the like. For example, the process 50 can be implemented by the node 100, the processing device 200, or any other suitable device.

The steps include operating an Operations, Administration, and Maintenance (OAM) session with an adjacent network element (step 52); and detecting an optical bypass in the G.8032 ring based on the OAM session (step 54). The steps can further include flushing a forwarding database of the network element based on the optical bypass (step 56). The steps can further include detecting prior to the optical bypass, that a neighboring node includes a ring block (step 58); and, subsequent to the optical bypass, installing a new channel block (step 60). The steps can further include removing the new channel block if another channel block is detected on the G.8032 (step 62).

The ring block can be detected via a Type-Length-Value (TLV) field in a packet associated with the OAM session. The OAM session can include Continuity Check Messages (CCMs). The optical bypass can be detected based on an auto remote Maintenance End Point (MEP) discovery and a timeout of an old remote MEP. An optical switching device can be configured to connect the ports to the G.8032 ring under normal conditions and to connect the ports together responsive to a node fault, thereby providing the optical bypass.

Example Node

Figure 24:
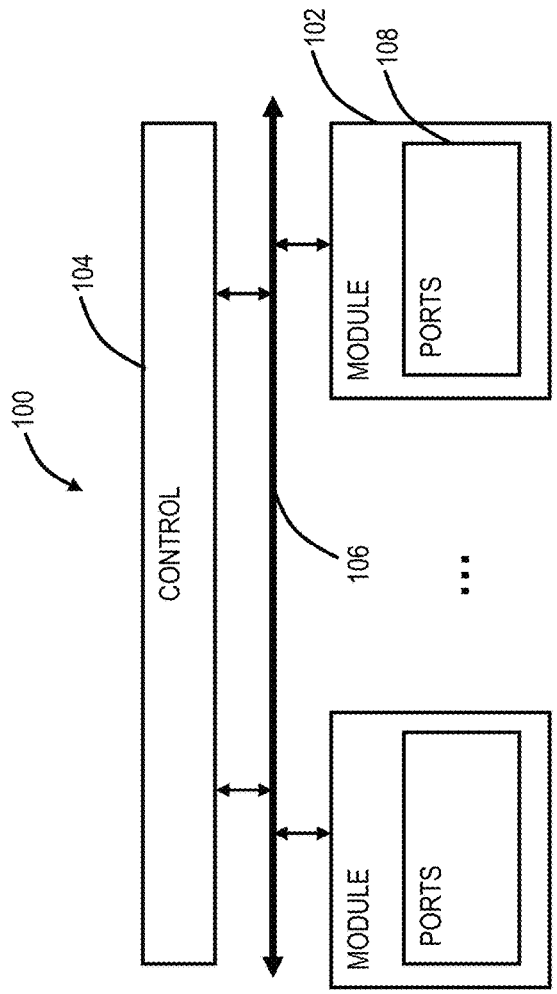
FIG. 24 is a block diagram of an example implementation of a node.

FIG. 24 is a block diagram of an example implementation of a node 100, such as for any of the nodes A, B, C, D, E, F in the network 10. Those of ordinary skill in the art will recognize FIG. 24 is a functional diagram in an oversimplified manner, and a practical embodiment may include additional components and suitably configured processing logic to support known or conventional operating features that are not described in detail herein.

In an embodiment, the node 100 is a packet switch, but those of ordinary skill in the art will recognize the systems and methods described herein can operate with other types of network elements and other implementations that support SR networking. In this embodiment, the node 100 includes a plurality of modules 102, 104 interconnected via an interface 106. The modules 102, 104 are also known as blades, line cards, line modules, circuit packs, pluggable modules, etc. and generally refer to components mounted on a chassis, shelf, etc. of a data switching device, i.e., the node 100. Each of the modules 102, 104 can include numerous electronic devices and/or optical devices mounted on a circuit board along with various interconnects, including interfaces to the chassis, shelf, etc.

Two example modules are illustrated with line modules 102 and a control module 104. The line modules 102 include ports 108, such as a plurality of Ethernet ports. For example, the line module 102 can include a plurality of physical ports disposed on an exterior of the module 102 for receiving ingress/egress connections. Additionally, the line modules 102 can include switching components to form a switching fabric via the interface 106 between all of the ports 108, allowing data traffic to be switched/forwarded between the ports 108 on the various line modules 102. The switching fabric is a combination of hardware, software, firmware, etc. that moves data coming into the node 100 out by the correct port 108 to the next node 100. "Switching fabric" includes switching units in a node; integrated circuits contained in the switching units; and programming that allows switching paths to be controlled. Note, the switching fabric can be distributed on the modules 102, 104, in a separate module (not shown), integrated on the line module 102, or a combination thereof.

The control module 104 can include a microprocessor, memory, software, and a network interface. Specifically, the microprocessor, the memory, and the software can collectively control, configure, provision, monitor, etc. the node 100. The network interface may be utilized to communicate with an element manager, a network management system, etc. Additionally, the control module 104 can include a database that tracks and maintains provisioning, configuration, operational data, and the like.

Again, those of ordinary skill in the art will recognize the node 100 can include other components which are omitted for illustration purposes, and that the systems and methods described herein are contemplated for use with a plurality of different network elements with the node 100 presented as an example type of network element. For example, in another embodiment, the node 100 may include corresponding functionality in a distributed fashion. In a further embodiment, the chassis and modules may be a single integrated unit, namely a rack-mounted shelf where the functionality of the modules 102, 104 is built-in, i.e., a "pizza-box" configuration. That is, FIG. 24 is meant to provide a functional view, and those of ordinary skill in the art will recognize actual hardware implementations may vary.

Example Controller

Figure 25:
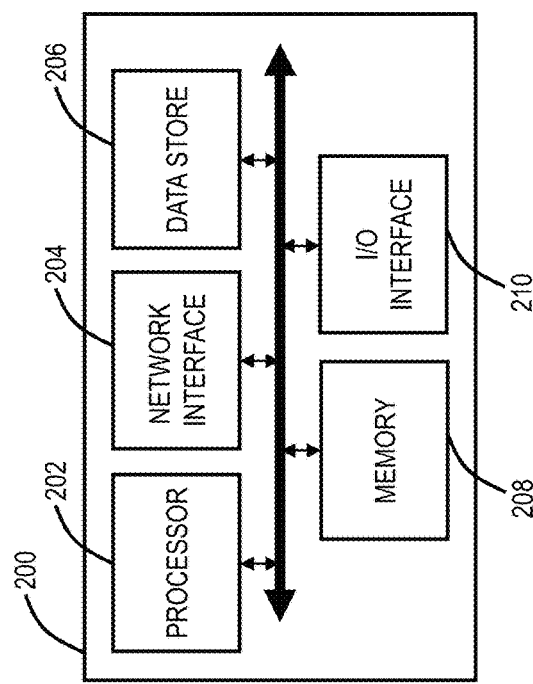
FIG. 25 is a block diagram of an example processing device.

FIG. 25 is a block diagram of an example processing device 200, which can form a control module for a network element, etc. The processing device 200 can be part of the network element, or a stand-alone device communicatively coupled to the network element. Also, the processing device 200 can be referred to in implementations as a control module, a shelf controller, a shelf processor, a system controller, etc. The processing device 200 can include a processor 202 which is a hardware device for executing software instructions. The processor 202 can be any custom made or commercially available processor, a central processing unit (CPU), an auxiliary processor among several processors associated with the processing device 200, a semiconductor-based microprocessor (in the form of a microchip or chipset), or generally any device for executing software instructions. When the processing device 200 is in operation, the processor 202 is configured to execute software stored within the memory, to communicate data to and from the memory, and to generally control operations of the processing device 200 pursuant to the software instructions. The processing device 200 can also include a network interface 204, a data store 206, memory 208, an I/O interface 210, and the like, all of which are communicatively coupled to one another and to the processor 202.

The network interface 204 can be used to enable the processing device 200 to communicate on a data communication network, such as to communicate to a management system, to the nodes 12, the like. The network interface 204 can include, for example, an Ethernet module. The network interface 204 can include address, control, and/or data connections to enable appropriate communications on the network. The data store 206 can be used to store data, such as control plane information, provisioning data, Operations, Administration, Maintenance, and Provisioning (OAM&P) data, etc. The data store 206 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 206 can incorporate electronic, magnetic, optical, and/or other types of storage media. The memory 208 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 208 may incorporate electronic, magnetic, optical, and/or other types of storage media. Note that the memory 208 can have a distributed architecture, where various components are situated remotely from one another, but may be accessed by the processor 202. The I/O interface 210 includes components for the processing device 200 to communicate with other devices.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, at least one processor, circuit/circuitry, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, it is noted that the various elements, operations, steps, methods, processes, algorithms, functions, techniques, etc. described herein can be used in any and all combinations with each other.

What is claimed is:

1. A network element configured to operate in a G.8032 ring, the network element comprising:
   a plurality of ports interconnected by circuitry configured to
      operate an Operations, Administration, and Maintenance (OAM) session with an adjacent network element, and
      detect an optical bypass in the G.8032 ring based on the OAM session, wherein the optical bypass is detected based on auto discovery of a remote Maintenance End Point (MEP) and a timeout of an old remote MEP.

2. The network element of claim 1, wherein the circuitry is further configured to
   flush a forwarding database of the network element based on the optical bypass.

3. The network element of claim 1, wherein the circuitry is further configured to
   detect, prior to the optical bypass, that a neighboring node includes a ring block, and
   subsequent to the optical bypass, install a new channel block on the G.8032 ring.

4. The network element of claim 3, wherein the circuitry is further configured to
   remove the new channel block if another channel block is detected on the G.8032 ring.

5. The network element of claim 3, wherein the ring block is detected via a Type-Length-Value (TLV) field in a packet associated with the OAM session.

6. The network element of claim 1, wherein the OAM session includes Continuity Check Messages (CCMs).

7. The network element of claim 1, further comprising
   an optical switching device that is configured to connect ring ports of the plurality of ports to the G.8032 ring under normal conditions and to connect the ring ports together responsive to a node fault, thereby providing the optical bypass.

8. A network element configured to operate in a G.8032 ring, the network element comprising:
   a plurality of ports interconnected by circuitry configured to
      operate an Operations, Administration, and Maintenance (OAM) session with an adjacent network element,
      detect an optical bypass in the G.8032 ring based on the OAM session,
      detect, prior to the optical bypass, that a neighboring node includes a ring block, and
      subsequent to the optical bypass, install a new channel block on the G.8032 ring and remove the new channel block if another channel block is detected on the G.8032 ring.

9. The network element of claim 8, wherein the circuitry is further configured to
   flush a forwarding database of the network element based on the optical bypass.

10. The network element of claim 8, wherein the ring block is detected via a Type-Length-Value (TLV) field in a packet associated with the OAM session.

11. The network element of claim 8, wherein the OAM session includes Continuity Check Messages (CCMs).

12. The network element of claim 8, further comprising
    an optical switching device that is configured to connect ring ports of the plurality of ports to the G.8032 ring under normal conditions and to connect the ring ports together responsive to a node fault, thereby providing the optical bypass.

13. A network element configured to operate in a G.8032 ring, the network element comprising:
    a plurality of ports interconnected by circuitry configured to
       operate an Operations, Administration, and Maintenance (OAM) session with an adjacent network element, and
       detect, prior to an optical bypass, that a neighboring node includes a ring block, wherein the ring block is detected via a Type-Length-Value (TLV) field in a packet associated with the OAM session, and subsequent to the optical bypass, install a new channel block on the G.8032 ring.

14. The network element of claim 13, wherein the circuitry is further configured to
flush a forwarding database of the network element based on the optical bypass.

15. The network element of claim 13, wherein the circuitry is further configured to
remove the new channel block if another channel block is detected on the G.8032 ring.

16. The network element of claim 13, wherein the OAM session includes Continuity Check Messages (CCMs).

17. The network element of claim 13, further comprising
an optical switching device that is configured to connect ring ports of the plurality of ports to the G.8032 ring under normal conditions and to connect the ring ports together responsive to a node fault, thereby providing the optical bypass.

\* \* \* \* \*